United States Patent
Shi et al.

(10) Patent No.: US 11,860,317 B1
(45) Date of Patent: Jan. 2, 2024

(54) OPTICAL ADJUSTMENT FOR IMAGE FUSION LIDAR SYSTEMS

(71) Applicant: Tanway Technology (Beijing) Co., Ltd., Beijing (CN)

(72) Inventors: Feifei Shi, Beijing (CN); Shiwei Wang, Beijing (CN); Ruitong Zheng, Beijing (CN); Luofeng Shen, Beijing (CN)

(73) Assignee: Tanway Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/255,081

(22) PCT Filed: Feb. 16, 2022

(86) PCT No.: PCT/CN2022/076518
§ 371 (c)(1),
(2) Date: May 30, 2023

(87) PCT Pub. No.: WO2023/142181
PCT Pub. Date: Aug. 3, 2023

(30) Foreign Application Priority Data

Jan. 30, 2022 (CN) .......................... 202210114472.4

(51) Int. Cl.
*G01S 7/48* (2006.01)
*G01S 7/497* (2006.01)
(Continued)

(52) U.S. Cl.
CPC .......... *G01S 7/4972* (2013.01); *G01S 7/4802* (2013.01); *G01S 7/4808* (2013.01); *G01S 7/4816* (2013.01); *G01S 17/89* (2013.01)

(58) Field of Classification Search
None
See application file for complete search history.

(56) References Cited

U.S. PATENT DOCUMENTS 11,162,785 B2 * 11/2021 Newkirk .............. G01B 11/275
2005/0121596 A1 6/2005 Kam et al.
(Continued)

FOREIGN PATENT DOCUMENTS

| CN | 101173987 A | 5/2008 |
|---|---|---|
| CN | 103308925 A | 9/2013 |

(Continued)

OTHER PUBLICATIONS

International Searching Authority (ISA/CN), International Search Report for PCT/CN2022/076518, dated Oct. 31, 2022, 10 pages (with translation).
(Continued)

*Primary Examiner* — Hovhannes Baghdasaryan
(74) *Attorney, Agent, or Firm* — Jaffery Watson Mendonsa & Hamilton LLP (57) ABSTRACT

A method and a system for optically adjusting an image fusion LiDAR system are provided. The method includes: presetting initial positions of a first detector and a second detector; acquiring signal strengths of the echo signals emitted by diffuse reflection at different positions on a background wall detected by the first detector; determining a first mark position on the background wall according to the signal strengths of the echo signals; and adjusting at least one of a position or an attitude of the second detector according to an echo signal emitted by diffuse reflection at the first mark position, the first detector and the second detector being each a linear array detector.

18 Claims, 4 Drawing Sheets

(51) Int. Cl.
*G01S 7/481* (2006.01)
*G01S 17/89* (2020.01)

(56) References Cited

U.S. PATENT DOCUMENTS

| | | | | |
|---|---|---|---|---|
| 2009/0033926 | A1* | 2/2009 | Haug | G06T 7/80 |
| | | | | 356/243.1 |
| 2014/0233023 | A1* | 8/2014 | Soininen | G01B 11/26 |
| | | | | 356/138 |
| 2021/0141094 | A1 | 5/2021 | Russ et al. | |

FOREIGN PATENT DOCUMENTS

| | | |
|---|---|---|
| CN | 106707261 A | 5/2017 |
| CN | 110018488 A | 7/2019 |
| CN | 110390695 A | 10/2019 |
| CN | 111505654 A | 8/2020 |
| CN | 112305557 A | 2/2021 |
| CN | 112505663 A | 3/2021 |
| CN | 112912766 A | 6/2021 |
| CN | 112927302 A | 6/2021 |
| CN | 114137553 A | 3/2022 |
| CN | 113740876 B | 4/2023 |

OTHER PUBLICATIONS

The State Intellectual Proprty Office of People's Republic of China, Written Opinion for PCT/CN2022/076518, dated Oct. 31, 2022, 10 pages (with translation).

The State Intellectual Proprty Office of People's Republic of China, Notification to Grant Patent Right for Invention for Chinese Patent Application No. 202210114472.4, dated Mar. 22, 2022, 6 pages (with translation).

Liu Jin-Yue et al. "High efficient extrinsic parameter calibration method of 3D LiDAR-camera system," Chinese Journal of Scientific Instrument, Nov. 2019, pp. 64-72, vol. 40 No. 11, China Academic Journal Electronic Publishing House.

* cited by examiner

OPTICAL ADJUSTMENT FOR IMAGE FUSION LIDAR SYSTEMS

CROSS-REFERENCE TO RELATED APPLICATIONS

This application is a national phase application of International Application No. PCT/CN2022/076518, filed on Feb. 16, 2022, which claims the priority to Chinese Patent Application No. 202210114472.4, entitled "OPTICAL ADJUSTMENT AND METHODS FOR IMAGE FUSION LIDAR SYSTEMS," filed on Jan. 30, 2022, with the China National Intellectual Property Administration, the entire contents of which are incorporated herein by reference.

TECHNICAL FIELD

The present disclosure relates to the field of LiDAR technologies, and particularly to methods and systems for optically adjusting image fusion LiDAR systems.

BACKGROUND

Three-dimensional environment measurement and perception have important civil and military application values. In aided driving and automatic driving systems, carrying out space distance measurement and three-dimensional environment reconstruction on a surrounding environment of a vehicle is a precondition for realizing high-precision automatic driving control. Three-dimensional visual reconstruction of millimeter wave radars and cameras is a relatively common distance measurement technology, but in an automatic driving application scene, it is difficult for a transverse resolution of the millimeter wave radars to meet requirements, and the millimeter wave radars are easily interfered by metal objects. The distance measurement precision of the three-dimensional visual reconstruction of the cameras is low, and accurate distance measurement is difficult to achieve for a long-distance target. Laser radar actively emits pulse-type infrared laser beams to irradiate a measured object to form diffuse reflection echoes which are collected by a receiving system. Distance information of the object to be measured can be obtained by measuring a time difference between the transmitted pulse and the received echo. The laser radar has the advantages of high ranging precision and high transverse resolution and has wide application prospects in the field of aided driving and automatic driving.

In the current field of automatic driving, multiple detectors tend to be used, for example, laser radar, a visible light camera, a 3 D camera, millimeter-wave radar, and the like, and the multiple detectors are fused and used by combining the characteristics of different detectors. The multi-detector fusion solution can ensure accurate measurement of the surrounding environment and ensure safe driving in complex weather. The fusion of the visible light camera and LiDAR is a common collocation, which is realized by the fusion of an image detector and a photoelectric detector. The photoelectric detector can sense the surrounding environment in real time and construct a high-precision map, and the image detector can realize the functions of detecting blind areas, identifying traffic signs and the like.

Refer to patent application No. CN202210040879.7 entitled "Radar Detection System and Method for Image Fusion LiDAR." A structure of the radar detection system for image fusion laser disclosed in this patent application adopts a LiDAR system in which an image detection module and a photoelectric detection module are integrated. The advantages of the structure are that the photoelectric detection module and the image detection module are coupled into the same radar detection system, which can avoid a complicated position conversion relationship and the time synchronization precision can reach a microsecond level. However, when realizing the position correspondence, the photoelectric detection module and the image detection module need to rely on expensive mechanical precision to ensure that the photoelectric detector and the image detector detect the same object at the same time in the LiDAR system for image fusion laser. However, in the prior art, the machining precision is usually used to solve the problem of accumulated errors in the assembly and adjustment precision, that is, different types of detectors in the LiDAR system collect the same target object information at the same time through the machining precision. However, the precise machining is expensive, and is not conducive to mass production. Therefore, how to ensure that the image detector and the photoelectric detector detect the same object at the same time remains to be solved.

SUMMARY (I) Technical problems to be solved

The present disclosure aims at solving the problem of accumulated errors in image fusion LiDAR systems in the prior art caused by ensuring assembly and adjustment precision through machining precision to ensure that the image detector and the photoelectric detector detect the same object at the same time, and solves the problem of expensive precise machining cost, which is not conducive to mass production.

(II) Technical solutions

To solve the technical problems above, the embodiments of the present disclosure provide methods and systems for optically adjusting an image fusion LiDAR system.

According to a first aspect, the embodiments of the present disclosure provide a method of optically adjusting an image fusion LiDAR system, wherein the method includes:

presetting initial positions of a first detector and a second detector;

acquiring signal strengths of echo signals emitted by diffuse reflection at different positions on a background wall detected by the first detector;

determining a first mark position on the background wall according to the signal strengths of the echo signals; and adjusting at least one of a position or an attitude of the second detector according to an echo signal emitted by diffuse reflection at the first mark position, wherein each of the first detector and the second detector is a linear array detector.

Optionally, determining the first mark position on the background wall according to the signal strengths of the echo signals includes:

determining a position of the echo signal with the maximum signal strength on the background wall as the first mark position when the signal strengths of the echo signals is maximum.

Optionally, adjusting at least one of the position or the attitude of the second detector according to the echo signal emitted by the diffuse reflection at the first mark position includes:

adjusting at least one of the position or the attitude of the second detector until the second detector detects the maximum signal strength of the echo signals emitted by the diffuse reflection at the first mark position.

Optionally, determining the first mark position on the background wall according to the signal strengths of the echo signals includes:

determining the first mark position in a horizontal direction of the background wall according to the signal strengths of the echo signals; and wherein adjusting at least one of the position or the attitude of the second detector according to the echo signal emitted by diffuse reflection at the first mark position includes:

adjusting at least one of the position or the attitude of the second detector in the horizontal direction according to the echo signal emitted by the diffuse reflection at the first mark position.

Optionally, after adjusting at least one of the position or the attitude of the second detector in the horizontal direction according to the echo signal emitted by the diffuse reflection at the first mark position, the method further includes:

setting a straight line at which the first mark position is located in the vertical direction as a mark line, and presetting an intersection point of the mark line and an echo signal optical axis as a second mark position; and adjusting at least one of a position or an attitude of the first detector or at least one of the position or the attitude of the second detector in the vertical direction according to an echo signal emitted by diffuse reflection at the second mark position.

Optionally, the first detector is an image detector, and the second detector is a photoelectric detector; and the method further includes:

after determining the first mark position on the background wall according to the signal strengths of the echo signals, adjusting at least one of a position or an attitude of a laser emitting module until a laser signal emitted by the laser emitting module is capable of being irradiated to the first mark position.

Optionally, the first detector is a photoelectric detector, and the second detector is an image detector; and the method further includes:

after determining the first mark position on the background wall according to the signal strengths of the echo signals, determining at least one of a position or an attitude when a laser signal emitted by a laser emitting module is irradiated to the first mark position as at least one of an optimal position and an optimal attitude of the laser emitting module.

Optionally, determining the first mark position on the background wall according to the signal strengths of the echo signals includes:

determining the first mark position in a horizontal direction of the background wall according to the signal strengths of the echo signals; and adjusting at least one of the position or the attitude of the second detector according to the echo signal emitted by diffuse reflection at the first mark position, includes:

adjusting at least one of a position or an attitude of the second detector in the horizontal direction according to the echo signal emitted by the diffuse reflection at the first mark position.

Optionally, the method further includes:

after adjusting at least one of the position or the attitude of the second detector in the horizontal direction according to the echo signal emitted by the diffuse reflection at the first mark position, setting a straight line at which the first mark position is located in the vertical direction as a mark line, and presetting an intersection point of the mark line and an echo signal optical axis as a second mark position; and adjusting at least one of a position or an attitude of the first detector or at least one of the position or the attitude of the second detector in the vertical direction according to an echo signal emitted by diffuse reflection at the second mark position.

In a second aspect, the embodiments of the present disclosure further provide a system for optically adjusting an image fusion LiDAR system, wherein the system includes: a laser emitting module, a light splitting module, a photoelectric detector, an image detector, a visible light emitter, a background wall, and a controller;

the photoelectric detector and the image detector are located on two sides of the light splitting module, respectively;

the laser emitting module is configured to emit a laser signal to the background wall; and the visible light emitter is configured to emit a visible light signal to the background wall;

the light splitting module is configured to split an echo signal reflected by the background wall into visible light and laser; and the photoelectric detector is configured to receive the laser, and the image detector is configured to receive the visible light; and the controller is configured to execute the method according to the embodiments of the present disclosure.

In a third aspect, the embodiments of the present disclosure further provide an electronic device, including: a processor; and a memory for storing instructions executable by the processor; wherein, the processor is configured to execute part or all of the steps in each embodiment of the method for optical elements adjustments for image fusion LiDAR systems provided by the first aspect of the present disclosure by calling the program or instruction stored in the memory.

In a fourth aspect, the embodiments of the present disclosure further provide a computer storage medium, wherein the computer storage medium may store a program, and the program, when executed, may implement part or all of the steps in each embodiment of the method for optical elements adjustments for image fusion LiDAR systems provided by the first aspect of the present disclosure.

It is to be understood that both the foregoing general description and the following detailed description are exemplary and explanatory only and are not restrictive of the present disclosure.

BRIEF DESCRIPTION OF THE DRAWINGS

The accompanying drawings herein are incorporated into the specification and constitute a part of the specification, show the embodiments consistent with the present disclosure, and serve to explain the principles of the present disclosure together with the specification.

In order to illustrate the technical solutions in the embodiments of the present disclosure or the prior art more clearly, the drawings to be used in the description of the embodiments or the prior art will be briefly described below. Obviously, those of ordinary skills in the art can also obtain other drawings based on these drawings without going through any creative work.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. Based on the embodiments of the present disclosure, all other embodiments obtained by those of ordinary skills in the art without going through any creative work shall fall within the scope of protection of the present disclosure.

Figure 1:
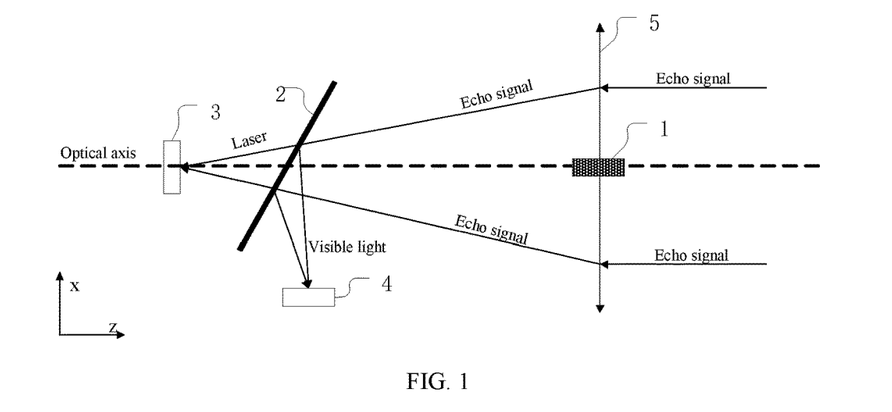
FIG. 1 is a schematic structure diagram of a LiDAR system utilizing image-laser fusion in the prior art.
Figure 2:
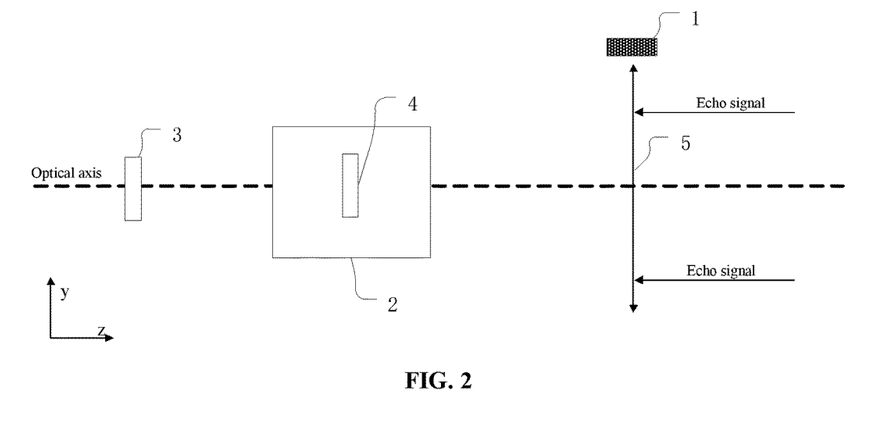
FIG. 2 is a schematic structural diagram of the LiDAR system utilizing image-laser fusion shown in FIG. 1 from another perspective.

In the related art, a structure of an existing image fusion LiDAR system is shown in FIGS. 1 and 2. FIG. 1 is a structural schematic diagram of the LiDAR system with image-laser fusion in the prior art, and FIG. 2 is a structural schematic diagram of the LiDAR system for image-laser fusion shown in FIG. 1 from another perspective. As shown in FIGS. 1 and 2, the system includes a horizontal direction, a vertical direction and an optical axis direction of an echo signal, wherein the vertical direction y is a height direction of an image detector, the horizontal direction x is a direction that a light splitting module points to an image detector, and z direction is the optical axis direction of the echo signal. As can be seen from FIGS. 1 and 2, the system includes a laser emitting module 1, a light splitting module 2, a photoelectric detector 3, and an image detector 4. The photoelectric detector 3 and the image detector 4 are arranged at two sides of the light splitting module 2, respectively. The laser emitting module 1 and the image detector 4 are simultaneously triggered to work. The system further includes a focusing lens set 5. The focusing lens set 5 is arranged in front of the light splitting module 2 and configured to irradiate the focused echo signal onto the light splitting module 2. The light splitting module includes a dichroic mirror, as shown in FIGS. 1 and 2, an included angle R between the dichroic mirror and the echo signal optical axis z direction satisfies that: 40° <R <50°.

In the LiDAR system for image-laser fusion shown in FIGS. 1 and 2, laser radar point cloud and image information share a receiving optical path, while visible light and laser are separated by the light splitting module 2 and enter the image detector 4, and the photodetector 3, respectively. The image detector 3 and the photoelectric detector 4 are arranged in minor symmetry along a plane of the light splitting module 2 receiving the echo signal. The system has the following advantages. First, a duality relation of the point cloud information and the image information in space is ensured through the optical path design. That is, the system for image fusion laser is symmetrically designed by means of a positional relationship between the image detector 4 and the photoelectric detector 3, and a coordinate system of the photoelectric detector 3 and a coordinate system of the image detector 4 are already fused in the same coordinate system, so that spatial synchronization is already realized without performing coordinate conversion. Second, when the laser emitting module 1 and the image detector 4 are simultaneously triggered by an external clock source, time alignment of a data acquisition layer is realized, and meanwhile, the design of the image fusion system ensures that measurement values of the photoelectric detector 3 and the image detector 4 are in the same coordinate system, and the photoelectric detector 3 and the image detector 4 at the same moment can detect the same target object at the same time through precise machining precision (tolerance of 0.005 mm). However, there is a problem of accumulated errors in ensuring assembly and adjustment precision through machining precision, and the precise machining cost is expensive, which is not conducive to mass production.

To address at least one of the above problems, the embodiments of the present disclosure provide a method of optically adjusting an image fusion LiDAR system, which may be executed by a system for optically adjusting an image fusion LiDAR system. The system for optical elements adjustments for image fusion LiDAR includes a first detector, a second detector, a laser emitting module, a light splitting module, a visible light emitter, and a background wall. The laser emitting module is configured to emit a laser signal to the background wall, and an echo signal emitted after diffuse reflection of the laser signal on the background wall is received by the first detector or the second detector. The visible light emitter is configured to emit a visible light signal to the background wall. The echo signal emitted by the visible light signal is diffusely reflected on the background wall and is then received by the first detector or the second detector. The echo signal emitted from the background wall includes a visible light signal and a laser signal. The light splitting module is configured to separate the visible light signal and the laser signal in the echo signal and making the visible light signal and the laser signal enter the first detector or the second detector, respectively.

Figure 3:
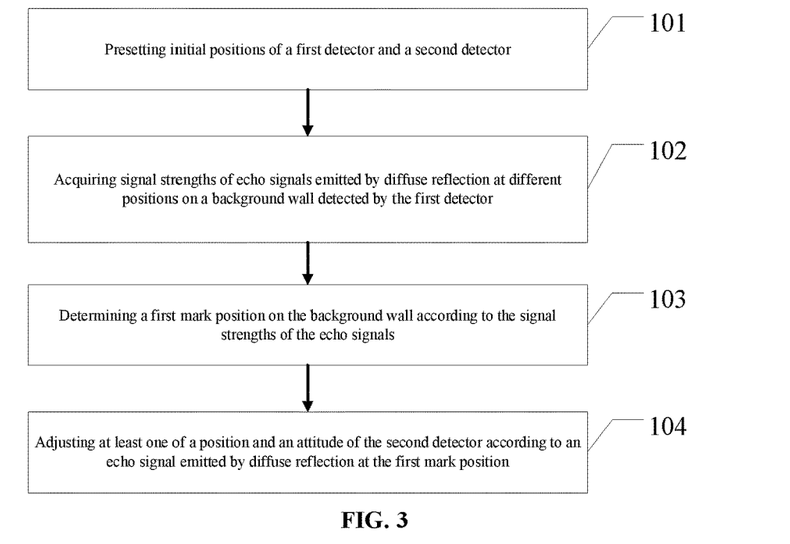
FIG. 3 is a schematic flow chart of a method of optically adjusting an image fusion LiDAR system in accordance with some embodiments of the present disclosure.

FIG. 3 is a flow chart of a method of optically adjusting an image fusion LiDAR system in accordance with some embodiments of the present disclosure. As shown in FIG. 3, the method includes the following steps.

At step 101, initial positions of a first detector and a second detector are preset.

It is preset that the first detector and the second detector are arranged in mirror symmetry along a plane of a light splitting module receiving an echo signal.

At step 102, the strength of echo signals emitted by diffuse reflection at different positions on a background wall detected by the first detector is acquired.

The laser emitting module is controlled to emit laser signals to different positions on the background wall, and echo signals resulted from the diffuse reflection of the laser signals at different positions on the background wall are received by the first detector. Alternatively, the visible light emitter is controlled to emit visible light signals to different positions on the background wall, and echo signals resulted from the diffuse reflection of the visible light signals at different positions on the background wall are received by the first detector. The echo signal emitted from the background wall includes a visible light signal and a laser signal. The light splitting module is configured to separate the visible light signal and the laser signal in the echo signal. The visible light signal or the laser signal is received by the first detector.

The first detector is kept unchanged at the preset initial position, and the laser emitting module is adjusted to emit laser signals to different positions of the background wall. Alternatively, the visible light emitter is adjusted to emit visible light signals to different positions of the background wall. The echo signal emitted after diffuse reflection of the laser signal or the visible light signal at different positions on the background wall is received by the first detector. The strength of the echo signals detected by the first detector is acquired.

At step 103, a first mark position on the background wall is determined according to the strength of the echo signals.

The first mark position of the echo signal on the background wall is determined according to the signal strengths of the echo signals. The echo signal emitted from the first mark position may be received by the first detector. That is, based on the initial position of the first detector, when the first detector is set in the initial position, the first mark position on the background wall corresponding to the initial position of the first detector may be determined according to the signal strengths of the echo signals detected by the first detector. As such, the echo signal emitted from the first mark position can be detected by the first detector.

At step 104, at least one of a position or an attitude of the second detector is adjusted according to the echo signal emitted by the diffuse reflection at the first mark position.

The first mark position on the background wall corresponding to the initial position of the first detector is determined by performing step 103. Then, at least one of the position or the attitude of the second detector is adjusted according to the echo signal emitted by the diffuse reflection at the first mark position. The purpose of adjusting at least one of the position or the attitude of the second detector based on the initial position of the first detector can be achieved. Moreover, since both the first detector and the second detector can simultaneously detect the echo signal emitted from the first mark position, it can be ensured that the first detector and the second detector can detect the same object at the same time. Each of the first detector and the second detector may be a linear array detector.

According to the method of optically adjusting an image fusion LiDAR system in accordance with some embodiments of the present disclosure, a novel optical elements adjustment method which does not depend on an expensive mechanical precision processing method is provided and can ensure that the photoelectric detector and the image detector detect the same object at the same moment in the image fusion LiDAR system, so as to ensure time synchronization precision. Meanwhile, the method for optical elements adjustment for an image fusion LiDAR system does not depend on the mechanical processing precision requirements, which broadens the machining precision and reduces the costs, and realizes the mass production of an image fusion LiDAR system.

In view of the adjustment of the position correspondence between the first detector and the second detector, especially the fine adjustment of the spatial positions of the first detector and the second detector in the LiDAR system, it is difficult to adjust the position correspondence between the first detector and the second detector by naked eyes, and there is no good method to adjust the position correspondence between the first detector and the second detector except for the expensive mechanical precision machining in the prior art. However, according to the methods provided by the embodiments of the present disclosure, at least one of the position or the attitude of the second detector is adjusted by marking the first mark position corresponding to the initial position of the first detector on the background wall, and at least one of the position or the attitude of the second detector is then adjusted according to the echo signal emitted from the first mark position resulted from the diffuse reflection, so that the first mark position is a radar optical elements adjustment position for image fusion LiDAR, and the position adjustment of a hardware structure in the LiDAR system is achieved by a simple adjustment method, which is simple and easy to operate, has high precision and greatly reduces the installation and adjustment costs of the whole system, and is easy for mass production.

Optionally, the first detector is an image detector, and the second detector is a photoelectric detector. Alternatively, the first detector is a photoelectric detector, and the second detector is an image detector. Each of the image detector and the photoelectric detector may be a linear array detector.

Optionally, for example, the first mark position may be determined according to an initial position of the photoelectric detector, and at least one of the position or the attitude of the image detector may be adjusted according to the first mark position. For example, the initial positions of the first detector and the second detector are preset. The strength of the echo signals emitted by the diffuse reflection at different positions on the background wall and detected by the photoelectric detector is acquired. The first mark position on the background wall is acquired according to the signal strengths of the echo signals, and at least one of the position or the attitude of the image detector is adjusted according to the echo signal emitted by the diffuse reflection at the first mark position.

Optionally, for example, the first mark position may be determined according to an initial position of the image detector, and at least one of the position or the attitude of the photoelectric detector may be adjusted according to the first mark position. For example, the initial positions of the first detector and the second detector are preset; signal strengths of the echo signals emitted by diffuse reflection at different positions on the background wall and detected by the image detector is acquired; the first mark position on the background wall is acquired according to the signal strengths of the echo signals; and at least one of the position or the attitude of the photoelectric detector is adjusted according to the echo signal emitted by the diffuse reflection at the first mark position.

Optionally, when adjusting at least one of the position or the attitude of the photoelectric detector or the image detector, for example, the first mark position may be determined in a horizontal direction according to the initial position of the photodetector, and at least one of the position or the attitude of the image detector may be adjusted according to the first mark position. Alternatively, in the horizontal direction, the first mark position is determined according to the initial position of the image detector, and at least one of the position or the attitude of the photoelectric detector is adjusted according to the first mark position. The horizontal direction is a horizontal direction of the background wall.

Optionally, when adjusting at least one of the position or the attitude of the photoelectric detector or the image detector, for example, the first mark position may be determined in a vertical direction according to the initial position of the photodetector, and at least one of the position or the attitude of the image detector may be adjusted according to the first mark position. Alternatively, in the vertical direction, the first mark position is determined according to the initial position of the image detector, and at least one of the position or the attitude of the photoelectric detector is adjusted according to the first mark position. The vertical direction is a vertical direction of the background wall.

Optionally, when adjusting at least one of the position or the attitude of the photoelectric detector or the image detector, for example, at least one of the position or the attitude of the photoelectric detector or the image detector may be determined in the horizontal direction, and then at least one of the position or the attitude of the photoelectric detector or the image detector may be adjusted in the vertical direction. For example, at least one of the position or the attitude of the photoelectric detector or the image detector may also be adjusted in the vertical direction, and then at least one of the position or the attitude of the photoelectric detector or the image detector is adjusted in the horizontal direction.

Optionally, adjusting at least one of the position or the attitude of the image detector may be, for example, adjusting at least one of the spatial position, a pitching angle, and a left-right deflection angle of the image detector. Adjusting at least one of the position or the attitude of the photoelectric detector may be, for example, adjusting at least one of the spatial position, a pitching angle, and a left-right deflection angle of the photoelectric detector.

According to the method in accordance with some embodiments of the present disclosure, an optical elements adjustment method which is simple and easy to operate and does not depend on the expensive mechanical precision machining is provided and can also ensure that the photoelectric detector and the image detector detect the same object at the same moment in the LiDAR system for image fusion laser, so as to ensure time synchronization precision. Meanwhile, a good optical elements adjustments effect can be achieved by adjusting at least one of the position or the attitude of at least one of the image detector and the photoelectric detector only in the horizontal direction or the vertical direction. At least one of the position or the attitude of at least one of the image detector and the photoelectric detector may be adjusted both in the horizontal direction and the vertical direction, and the precision of the adjustment method in accordance with some embodiments of the present disclosure is further improved by adjusting at least one of the position or the attitude in the horizontal direction and the vertical direction.

Optionally, at step 103, determining the first mark position on the background wall according to the strength of the echo signals may further include, for example, determining a position of the echo signal with the maximum signal strength on the background wall as the first mark position when the signal strength of the echo signals is the maximum. This can ensure that the first detector has the best effect when detecting the echo signal emitted from the first mark position.

Optionally, the first mark position is the first mark position in the horizontal direction of the background wall, and the first mark position is the first mark position in the horizontal direction of the background wall is one point. Optionally, the first mark position is the first mark position in the vertical direction of the background wall, and a straight line at which the first mark position in the horizontal direction of the background wall is located is a mark line. That is, the first mark position in the vertical direction of the background wall is one straight line, and the straight line is a mark line.

Optionally, at step 104, adjusting at least one of the position or the attitude of the second detector according to the echo signal emitted by the diffuse reflection at the first mark position may further include, for example, adjusting at least one of the position or the attitude of the second detector until the second detector detects the echo signal with the maximum signal strength emitted by the diffuse reflection at the first mark position. This can ensure that the second detector has the best effect when detecting the echo signal emitted from the first mark position.

Optionally, for example, the first detector is an image detector, and the second detector is a photoelectric detector. At step 103, the method may further include, for example: after determining the first mark position on the background wall according to the signal strengths of the echo signals, adjusting at least one of a position or an attitude of a laser emitting module until a laser signal emitted by the laser emitting module is capable of being irradiated to the first mark position.

Optionally, for example, at least one of a position or an attitude of a laser emitting module may be adjusted in the horizontal direction according to the first mark position in the horizontal direction of the background wall. Alternatively, at least one of the position or the attitude of the laser emitting module may be adjusted in the vertical direction according to the first mark position in the vertical direction of the background wall. Alternatively, the laser emitting module is adjusted both in the vertical direction and the vertical direction.

Optionally, for example, the first detector is a photoelectric detector, and the second detector is an image detector. At step 103, after the determining the first mark position on the background wall according to the signal strengths of the echo signals, for example, the method further includes: determining at least one of a position or an attitude when a laser signal emitted by a laser emitting module is irradiated to the first mark position as at least one of an optimal position and an optimal attitude of the laser emitting module.

When at least one of the position or the attitude of the photoelectric detector is adjusted, the laser emitting module needs to send a laser signal to a background wall, and then the first mark position is determined by the signal strengths of the echo signals emitted from the background wall by diffuse reflection. Therefore, when the first mark position corresponding to the initial position of the photoelectric detector can be determined, it means that the laser signal emitted by the laser emitting module irradiates the first mark position in this case, so that at least one of the position or the attitude when the laser signal emitted by the laser emitting module is irradiated to the first mark position as at least one of the optimal position and the optimal attitude of the laser emitting module.

Figure 4:
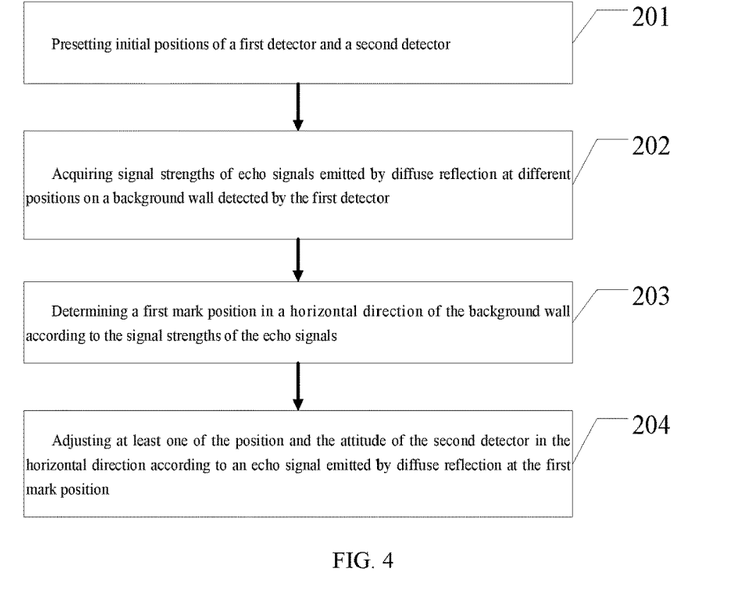
FIG. 4 is another schematic flow chart of a method of optically adjusting an image fusion LiDAR system in accordance with some embodiments of the present disclosure.

The above is only one embodiment of the present disclosure, and the embodiments of the present disclosure may also be shown in FIG. 4. FIG. 4 is another schematic flow chart of a method for optical elements adjustment for an image fusion LiDAR system in accordance with some embodiments of the present disclosure. As can be seen from FIG. 4, the method includes the following steps.

At step 201, initial positions of a first detector and a second detector are preset.

At step 202, signal strengths of the echo signals emitted by diffuse reflection at different positions on a background wall detected by the first detector is acquired.

At step 203, a first mark position in a horizontal direction of the background wall is determined according to the signal strengths of the echo signals.

A system for optical elements adjustments for image fusion LiDAR includes a horizontal direction, a vertical direction and an echo signal optical axis, wherein the vertical direction is a height direction of the first detector, and the horizontal direction is a direction in which the light splitting module points to the first detector. At step 203, the first mark position in the horizontal direction of the background wall may be determined according to the signal strengths of the echo signals. In the horizontal direction, the first mark position is one point.

Optionally, at step 203, the determining the first mark position in the horizontal direction of the background wall according to the signal strengths of the echo signals, for example, further includes: determining a position of the echo signal with the maximum signal strength on the background wall as the first mark position when the signal strengths of the echo signals is maximum.

The first detector is a linear array detector, and the linear detector includes detection units arranged in a linear array. However, the directions of the echo signals emitted by diffuse reflection at different positions on the background wall are different, and the signal strengths of the echo signals detected by the first detector is maximum only when the echo signal can be aligned with and irradiated to a straight line of the detection units arranged in a linear array in the first detector. On the contrary, the signal strengths of the echo signals detected by the first detector is weak, or the echo signal cannot be detected by the first detector, resulting in poor detection effect.

Therefore, when the signal strength of the echo signals is maximum, it means that the echo signal can be aligned with and irradiated to the straight line of the detection units arranged in a linear array in the first detector, and the position of the echo signal with the maximum signal strength on the background wall may be determined as the first mark position. That is, the echo signal emitted by diffuse reflection at the first mark position can be well detected by the first detector, and the first detector has a good detection effect when detecting the first mark position in this case.

At step 204, at least one of the position or the attitude of the second detector in the horizontal direction is adjusted according to the echo signal emitted by the diffuse reflection at the first mark position.

Optionally, at step 204, the adjusting at least one of the position or the attitude of the second detector in the horizontal direction according to the echo signal emitted by the diffuse reflection at the first mark position, for example, further includes: adjusting at least one of the position or the attitude of the second detector in the horizontal direction until the second detector detects the maximum signal strengths of the echo signals emitted by the diffuse reflection at the first mark position.

The second detector is a linear array detector, and the linear detector includes detection units arranged in a linear array. The signal strengths of the echo signals detected by the second detector is maximum only when the echo signal can be aligned with and irradiated to a straight line of the detection units arranged in a linear array in the second detector. If at least one of the position or the attitude of the second detector is not adjusted, the echo signal emitted by diffuse reflection at the first mark position may not be capable of being irradiated to the straight line, and the signal strengths of the echo signals detected by the second detector in this case is weak. Alternatively, the echo signal cannot be irradiated to the second detector at all, that is, the second detector cannot detect the echo signal, resulting in poor detection effect. If the echo signal cannot be detected, the first detector and the second detector cannot detect the same object at the same time.

Therefore, when the signal strength of the echo signals is maximum, it means that the echo signal can be aligned with and irradiated to the straight line of the detection units arranged in a linear array in the second detector in this case. Therefore, at least one of the position or the attitude of the second detector may be adjusted in the horizontal direction until the second detector detects the maximum signal strengths of the echo signals emitted by the diffuse reflection at the first mark position. That is, the echo signal emitted by diffuse reflection at the first mark position can be well detected by the second detector, and the second detector has a good detection effect when detecting the first mark position in this case.

Optionally, the first detector is an image detector, and the second detector is a photoelectric detector. Alternatively, the first detector is a photoelectric detector, and the second detector is an image detector. The image detector and the photoelectric detector are each a linear array detector.

According to the method in accordance with some embodiments of the present disclosure, the first detector and the second detector in the LiDAR system for image fusion laser can detect the same object at the same time by adjusting at least one of the position or the attitude of the second detector in the horizontal direction according to the position of the first detector only, so as to ensure time synchronization precision. Meanwhile, the operation is simple and easy to realize.

Figure 5:
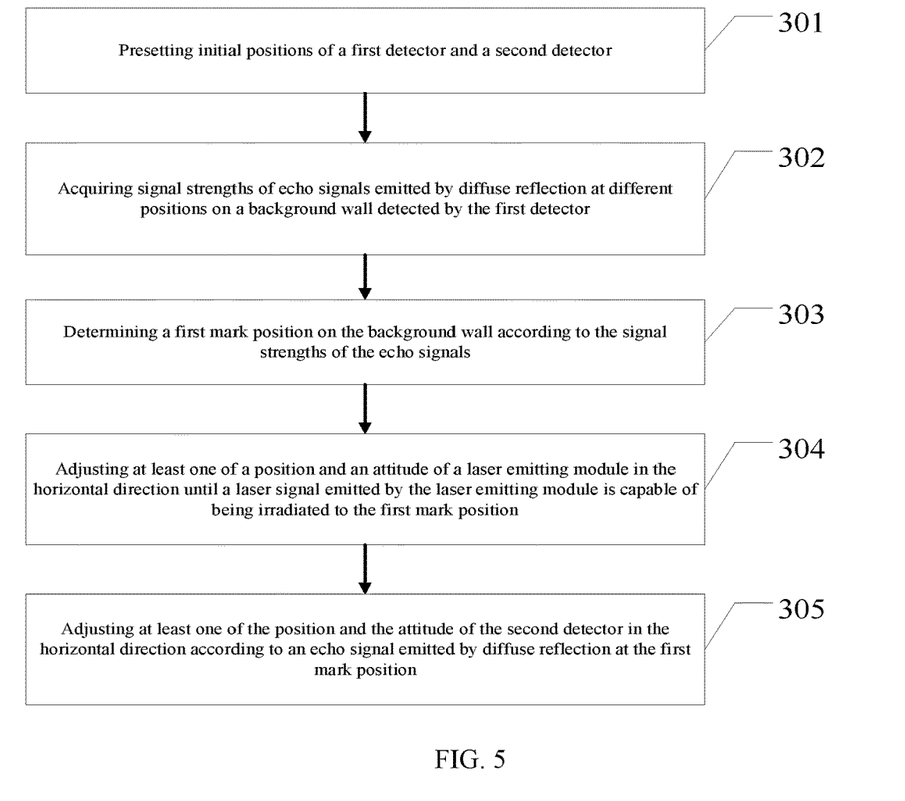
FIG. 5 is another schematic flow chart of a method of optically adjusting an image fusion LiDAR system in accordance with some embodiments of the present disclosure.

The above is only one embodiment of the present disclosure, and the embodiments of the present disclosure may also be shown in FIG. 5. FIG. 5 is another schematic flow chart of a method for optical elements adjustments for image fusion LiDAR in accordance with some embodiments of the present disclosure. As can be seen from FIG. 5, a first detector is an image detector, and a second detector is a photoelectric detector. The method includes the following steps.

At step 301, initial positions of the first detector and the second detector are preset.

At step 302, signal strengths of the echo signals emitted by diffuse reflection at different positions on a background wall detected by the first detector is acquired.

At step 303, a first mark position in a horizontal direction of the background wall is determined according to the signal strengths of the echo signals.

At step 304, at least one of a position or an attitude of a laser emitting module is adjusted in the horizontal direction until a laser signal emitted by the laser emitting module is capable of being irradiated to the first mark position.

At least one of the position or the attitude of the laser emitting module is adjusted in the horizontal direction based on the initial position of the first detector. The first mark position on the background wall corresponding to the initial position of the first detector is found out through step 303 first. The first mark position on the background wall is equivalent to a target object to be detected by the first detector and the second detector, and at least one of the position or the attitude of the laser emitting module is adjusted according to the first mark position, so as to achieve the purpose of adjusting at least one of the position or the attitude of the laser emitting module based on the initial position of the first detector. The laser emitting module is mainly configured to emit a laser detection signal to the target object. When the laser signal emitted by the laser emitting module can be irradiated to the first mark position, it means that at least one of the position or the attitude of the laser emitting module can be matched with the initial position of the first detector. That is, the first mark position can be detected by the first detector in this case, and the laser signal emitted by the laser emitting module can also be irradiated to the first mark position, wherein the first detector is an image detector. Therefore, in this case, the image detector can detect the target object, and the laser emitting module can also emit the laser detection signal to the target object, providing a prerequisite for the photoelectric detector to receive the echo signal returned by the target object in the later stage.

In fact, it is difficult to adjust a position relationship between the first detector and the laser emitting module by naked eyes, and there is no good way to adjust the position relationship between the first detector and the laser emitting module except for expensive mechanical precision machining in the prior art. However, the method in accordance with some embodiments of the present disclosure marks the first mark position corresponding to the initial position of the first detector on the background wall, and then adjusts at least one of the position or the attitude of the laser emitting module according to the first mark position, which is simple and easy to operate, greatly reduces the assembly and adjustment costs of the whole system, and is easy for mass production.

Optionally, adjusting at least one of the position or the attitude of the laser emitting module may be, for example, adjusting at least one laser emitting module the spatial position, a pitching angle, a left-right deflection angle, and a collimation situation of the laser emitting module.

The method provided by the embodiments of the present disclosure can satisfy an optical adjustment requirement well by adjusting at least one of the position or the attitude of the laser emitting module in the horizontal direction only, which is simple to operate.

At step 305, at least one of the position or the attitude of the second detector in the horizontal direction is adjusted according to the echo signal emitted by the diffuse reflection at the first mark position.

After adjusting at least one of the position or the attitude of the laser emitting module at the step 304, at least one of the position or the attitude of the laser emitting module can be matched with the initial position of the first detector in this case. Successively, at least one of the position or the attitude of the second detector is adjusted based on the initial position of the first detector. The purpose of adjusting at least one of the position or the attitude of the second detector based on the initial position of the first detector can be achieved. Moreover, since both the first detector and the second detector can simultaneously detect the echo signal emitted from the first mark position, it can be ensured that the first detector and the second detector can detect the same object at the same time.

Figure 6:
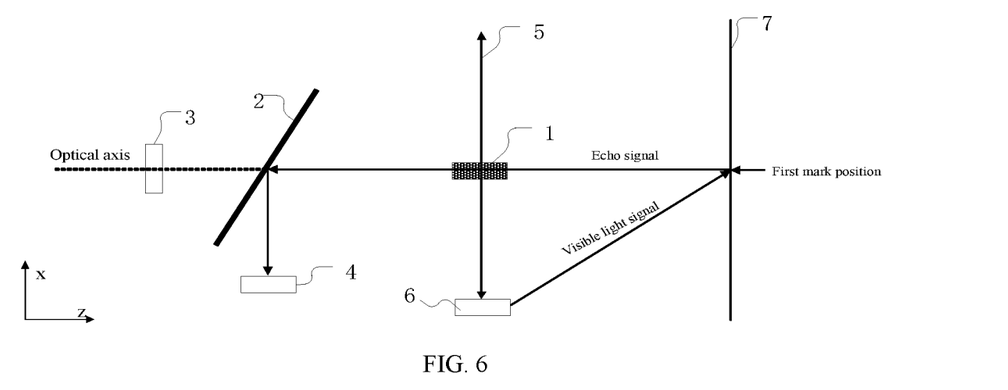
FIG. 6 is a schematic diagram for determining a first mark position in a horizontal direction of a background wall in accordance with some embodiments of the present disclosure.

FIG. 6 is a schematic diagram for determining a first mark position in a horizontal direction of a background wall in accordance with some embodiments of the present disclosure. The method for optical elements adjustments shown in FIG. 5 will be described with specific examples. As shown in FIG. 6, an image detector is used as a first detector and a photoelectric detector is used as a second detector. Initial positions of the photoelectric detector and the image detector are preset through machining precision, and the image detector is fixed. As shown in FIG. 6, it is preset that the photoelectric detector and the image detector are arranged in mirror symmetry along a plane of a light splitting module receiving an echo signal.

In FIG. 6, the system includes a horizontal direction and an echo signal optical axis extension direction, wherein the vertical direction x is a horizontal direction of a background wall, and the echo signal optical axis extension direction is a z direction. As shown in FIG. 6, the system includes a laser emitting module 1, a light splitting module 2, a photoelectric detector 3, and an image detector 4. The photoelectric detector 3 and the image detector 4 are arranged at two sides of the light splitting module 2, respectively. The system further includes a focusing lens set 5. The focusing lens set 5 is arranged in front of the light splitting module 2 and configured to irradiate the focused echo signal onto the light splitting module 2. The light splitting module includes a dichroic minor, as shown in FIGS. 1 and 2, an included angle R between the dichroic mirror and the echo signal optical axis z direction satisfies that: $40° \leq R \leq 50°$.

As shown in FIG. 6, on an xz plane, along the x direction, a visible light emitter 6 is arranged on one side of the focusing lens set 5. A background wall 7 is illuminated by the visible light emitter 6, and the signal strengths of the echo signals detected by the image detector 4 is observed by changing a position of the visible light signal on the background wall 7 in the x direction. That is, the echo signals emitted by diffuse reflection of the visible light signal at different positions on the background wall 7 are received by the image detector 4, and the signal strengths of the echo signals detected by the image detector 4 is acquired. When the signal strengths of the echo signals detected by the image detector 4 is maximum, the visible light emitter 6 is fixed, and a position of the echo signal with the maximum signal strength in the horizontal direction x of the background wall 7 is the first mark position, and the first mark position is the first mark position shown in FIG. 6, for example.

Optionally, initial positions of the photoelectric detector 3 and the image detector 4 are preset, that is, the photoelectric detector 3 and the image detector 4 are fixed at a position, for example, the photoelectric detector 3 is set at a position 50 mm away from the light splitting module along the echo signal optical axis direction z. The image detector 4 and the photoelectric detector 3 are arranged in mirror symmetry along a plane where the light splitting module 2 receives the echo signal.

Optionally, the whole optical adjustment process may be carried out in a dark room, for example, and the optical adjustment effect is better in the dark room.

Figure 7:
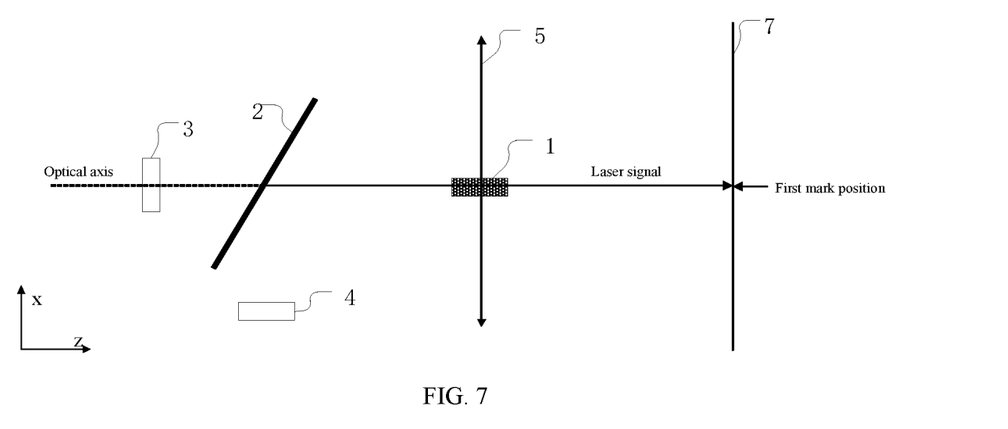
FIG. 7 is a schematic diagram for adjusting a laser signal emitted by a laser emitting module to the first mark position in accordance with some embodiments of the present disclosure.

Then, as shown in FIG. 7, FIG. 7 is a schematic diagram for adjusting the laser signal emitted by the laser emitting module to the first mark position in accordance with some embodiments of the present disclosure. In FIG. 7, at least one of the position or the attitude of the laser emitting module 1 is adjusted along the horizontal direction x on the xz plane until the laser signal emitted by the laser emitting module 1 can be irradiated to the first mark position.

Figure 8:
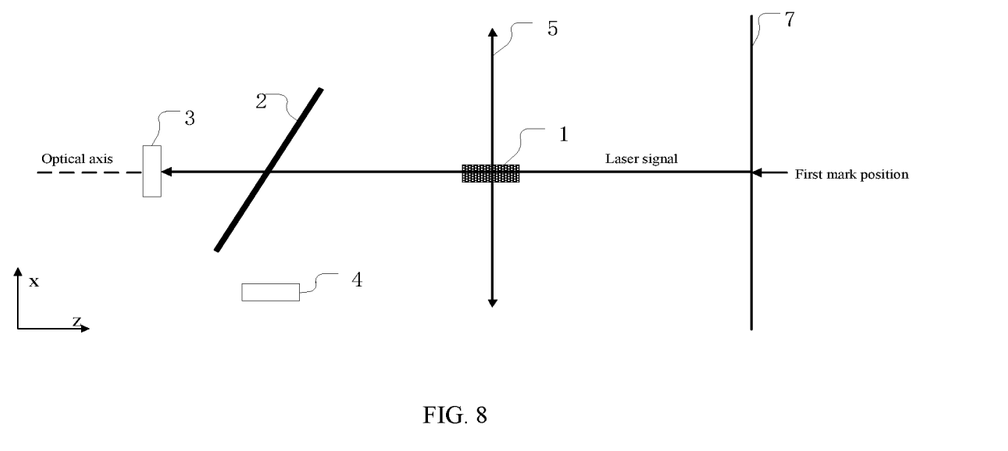
FIG. 8 is a schematic diagram for adjusting at least one of a position or an attitude of a second detector in accordance with some embodiments of the present disclosure.

After adjusting at least one of the position or the attitude of the laser emitting module 1, at least one of the position or the attitude of the laser emitting module 1 can be matched with the initial position of the image detector 4. Then, at least one of the position or the attitude of the photoelectric detector 3 is adjusted based on the initial position of the image detector 4. As shown in FIG. 8, FIG. 8 is a schematic diagram for adjusting at least one of the position or the attitude of the second detector in accordance with some embodiments of the present disclosure. In FIG. 8, at least one of the position or the attitude of the photoelectric detector 3 is adjusted along the horizontal direction x on the xz plane until the photoelectric detector 3 detects the maximum signal strengths of the echo signals emitted by the diffuse reflection at the first mark position.

The above is only one embodiment of the present disclosure, and the embodiments of the present disclosure may also include, for example, after adjusting at least one of the position or the attitude of the second detector in the horizontal direction according to the echo signal emitted by the diffuse reflection at the first mark position, the method further includes: setting a straight line at which the first mark position is located in the vertical direction as a mark line, and presetting an intersection point of the mark line and an echo signal optical axis as a second mark position; and adjusting at least one of the position or the attitude of the first detector or at least one of the position or the attitude of the second detector in the vertical direction according to an echo signal emitted by diffuse reflection at the second mark position.

Optionally, for example, at least one of the position or the attitude of the first detector or at least one of the position or the attitude of the second detector in the vertical direction may be adjusted until the first detector or the second detector can detect the echo signal emitted by diffuse reflection at the first mark position.

Optionally, at least one of the position or the attitude of the first detector or at least one of the position or the attitude of the second detector in the vertical direction is adjusted until the first detector or the second detector detects the maximum signal strengths of the echo signals emitted by diffuse reflection at the first mark position.

Figure 9:
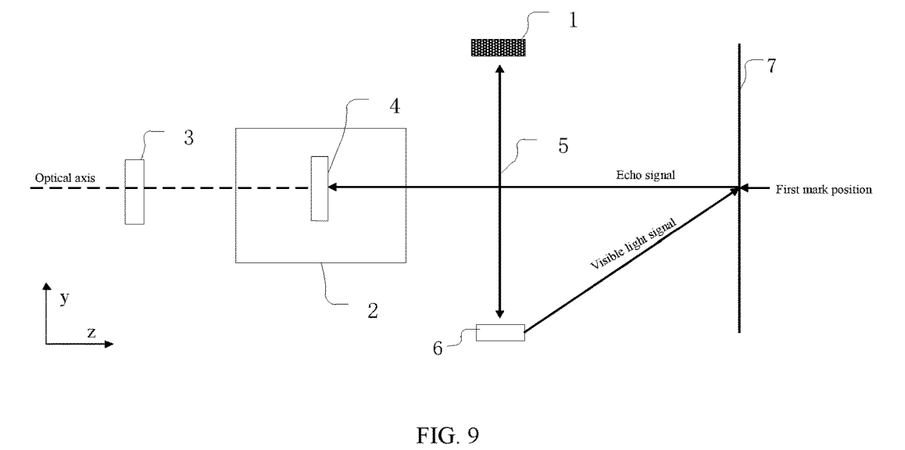
FIG. 9 is a schematic diagram for adjusting at least one of a position or an attitude of an image detector in the vertical direction in accordance with some embodiments of the present disclosure.

Illustratively, FIG. 9 is a schematic diagram for adjusting at least one of the position or the attitude of the image detector in the vertical direction in accordance with some embodiments of the present disclosure. As shown in FIG. 9, the first detector is an image detector. On a yz plane, a vertical direction y is a vertical direction of a background wall, and a straight line at which the first mark position is located in the vertical direction of the background wall 7 is a mark line, that is, on the background wall 7, a plurality of first mark positions are included along the vertical direction y, and the straight line formed by the plurality of first mark positions is the mark line. The mark line is a straight line in the y direction. An intersection point of the mark line and an echo signal optical axis z direction is preset as a second mark position. At least one of the position or the attitude of the image detector 4 in the vertical direction y is adjusted until the image detector 4 detects the maximum signal strengths of the echo signals. Preferably, the signal strengths of the echo signals detected by a central pixel of the image detector 4 is maximum. When the signal strengths of the echo signals is the maximum, it means that the echo signal can be aligned with and irradiated to a straight line of detection units arranged in a linear array in the image detector, and the detection effect of the image detector is better in this case. Therefore, at least one of the position or the attitude of the image detector in the vertical direction y in this case is at least one of the optimal position and the optimal attitude of the image detector in the vertical direction.

The method of adjusting the image detector in the vertical direction may be employed for adjusting at least one of the position or the attitude of the photoelectric detector in the vertical direction until the photoelectric detector detects the maximum signal strengths of the echo signals.

The above is only one embodiment of the present disclosure, and the embodiments of the present disclosure may also be the following method steps, wherein the method for optically adjusting an image fusion LiDAR system utilizing image-laser fusion includes the following steps.

At step 401, initial positions of a first detector and a second detector are preset.

At step 402, signal strengths of the echo signals emitted by diffuse reflection at different positions on a background wall detected by the first detector may be acquired.

At step 403, a first mark position in a horizontal direction of the background wall is determined according to the signal strengths of the echo signals.

Since the first mark position in the vertical direction of the background wall is a straight line and the first detector is a linear array detector, the echo signal diffuse reflected from the first mark position is a linear laser echo signal in the vertical direction. The first detector may receive the linear laser echo signal.

At step 404, at least one of a position or an attitude of the second detector is adjusted in the vertical direction according to the echo signal emitted by the diffuse reflection at the first mark position.

Optionally, at step 404, after the adjusting at least one of the position or the attitude of the second detector in the vertical direction according to the echo signal emitted by the diffuse reflection at the first mark position, the method further includes: setting a straight line at which the first mark position is located in the vertical direction as a mark line, and presetting an intersection point of the mark line and an echo signal optical axis as a second mark position; and adjusting at least one of the position or the attitude of the first detector or at least one of the position or the attitude of the second detector in the horizontal direction according to an echo signal emitted by diffuse reflection at the second mark position.

For example, reference can be made to patent application No. CN202110932598.8, entitled "Three-dimensional Laser Radar Light Path Adjusting Method and Apparatus, and Electronic Device". This patent discloses a method for adjusting a linear array photoelectric detector in a vertical direction. In the method of optically adjusting an image fusion LiDAR system in accordance with some embodiments of the present disclosure, when adjusting the vertical direction of the photoelectric detector, the method of optical adjustment for the photoelectric detector in the vertical direction in the patent CN202110932598.8 may also be employed.

Figure 10:
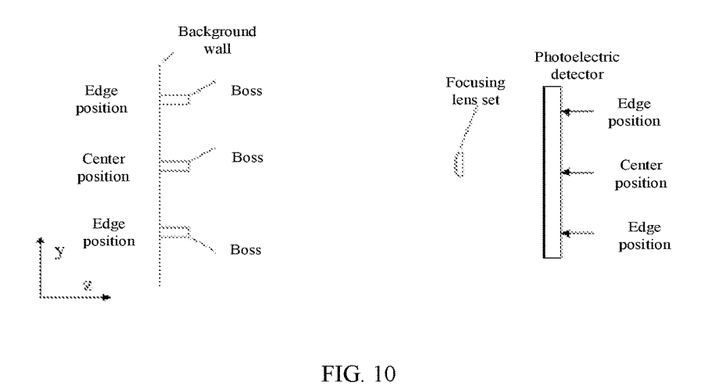
FIG. 10 is a schematic diagram for adjusting at least one of a position or an attitude of a photoelectric detector in the vertical direction in accordance with some embodiments of the present disclosure.

For example, as shown in FIG. 10, FIG. 10 is a schematic diagram for adjusting at least one of the position or the attitude of the photoelectric detector in the vertical direction in accordance with some embodiments of the present disclosure. As can be seen from FIG. 10, y direction is the vertical direction of the background wall, and z direction is the echo signal optical axis direction. The method of optically adjusting an image fusion LiDAR system, for example, further includes: acquiring a distance map generated by the echo signals emitted by the diffuse reflection from the background wall at a center position and an edge position of the photoelectric detector, wherein the distance map includes distance information of the edge position from the center position; and presetting the center position and the edge position of the preset background wall to be respectively provided with an obstacle. In the vertical direction y, at least one of the position or the attitude of the photoelectric detector is adjusted until the distance maps of the adjacent edge positions on both sides of the central position of the photodetector are symmetrically distributed.

In the method in accordance with some embodiments of the present disclosure, for example, bosses may also be respectively arranged on the background wall corresponding to the central position and the edge position, which is convenient for the photoelectric detector to locate the echo signals emitted from the central position and the edge position on the background wall. When a distance relationship between the center position and the edge position on the background wall is arranged in a certain way, according to the method, similar to a principle of pinhole imaging, the echo signal reflected by the boss is received by the photoelectric detector. By adjusting at least one of the position or the attitude of the photoelectric detector in the vertical direction, a center position and an edge position on the photoelectric detector may also be arranged as the distance arrangement between the center position and the edge position on the background wall.

The embodiments of the present disclosure further provide a system for optically adjusting an image fusion LiDAR system. Referring to the structures of the systems shown in FIGS. 6 and 9, the system for optically adjusting an image fusion LiDAR system may include: a laser emitting module 1, a light splitting module 2, a photoelectric detector 3, an image detector 4, a visible light emitter 6, a background wall 7, and a controller. The photoelectric detector 3 and the image detector 4 are respectively arranged at two sides of the light splitting module 2. The laser emitting module 1 is configured to emit a laser signal to the background wall 7, and the visible light emitter 6 is configured to emit a visible light signal to the background wall 7. The light splitting module 2 is configured to split the echo signal reflected by the background wall 7 into visible light and laser, the image detector 4 is configured to receive laser, and the photoelectric detector 3 is configured to receive the visible light. The controller is configured to execute the method of optically adjusting an image fusion LiDAR system according to the embodiments of the present disclosure.

As shown in FIGS. 6 and 9, the system further includes a focusing lens set 5. The focusing lens set 5 is arranged in front of the light splitting module 2 and used for irradiating the focused echo signal onto the light splitting module 2. The light splitting module 2 includes a dichroic minor, as shown in FIGS. 6 and 9. An included angle R between the dichroic mirror and the echo signal optical axis z direction satisfies that: 40°≤R≤50°.

Optionally, the controller includes an oscilloscope, for example, and the oscilloscope may be configured to detect the signal strengths of the echo signals.

Figure 11:
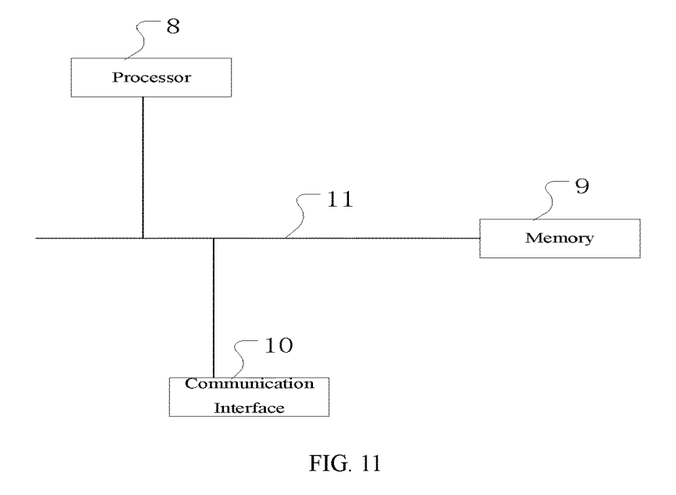
FIG. 11 is a schematic structural diagram of an electronic device in accordance with some embodiments of the present disclosure.

The embodiments of the present disclosure also provide an electronic device, and FIG. 11 is a structural schematic diagram of the electronic device in accordance with some embodiments of the present disclosure. As shown in FIG. 11, the electronic device includes a processor and a memory, and the processor executes the steps of the method of optically adjusting an image fusion LiDAR system as described in the above embodiments by executing a program or instruction stored in the memory, so the electronic device has the beneficial effects of the above embodiments and will not be repeated here.

As shown in FIG. 11, it may be arranged that the electronic device includes at least one processor 8, at least one memory 9 and at least one communication interface 10. Various components in the electronic device are coupled together through a bus system 11. The communication interface 10 is used for information transfer with external devices. It can be understood that the bus system 11 is configured to realize communications between these components. The bus system 11 includes a power bus, a control bus, and a status signal bus in addition to a data bus. However, for the sake of clarity, various buses are designated as the bus system 11 in FIG. 11.

It can be understood that the memory 9 in this embodiment may be a volatile memory or a non-volatile memory, or may include both volatile and non-volatile memories. In some embodiments, the memory 9 is stored with the following elements: executable units or data structures, or subsets thereof, or extension operating systems and applications thereof. In the embodiments of the present disclosure, the processor 8 is used to execute the steps of each embodiment of the method of optically adjusting an image fusion LiDAR system in accordance with some embodiments of the present disclosure by calling a program or instruction stored in the memory 9.

The method of optically adjusting an image fusion LiDAR system provided in the embodiments of the present disclosure may be applied to the processor 8 or implemented by the processor 8. The processor 8 may be an integrated circuit chip with a signal processing capacity. In an implementation process, the steps in the foregoing methods may be completed using an integrated logic circuit of hardware in the processor 8 or an instruction in a form of software. The processor 8 may be a general-purpose processor, a Digital Signal Processor (DSP), an Application Specific Integrated Circuit (ASIC), a Field Programmable Gate Array (FPGA) or other programmable logic device, discrete gate or transistor logic device, and discrete hardware component. The general-purpose processor may be a microprocessor, or the processor may be any conventional processor, or the like.

Steps of the method of optically adjusting an image fusion LiDAR system in accordance with some embodiments of the present disclosure may be directly executed and accomplished by means of a hardware decoding processor or may be executed and accomplished using a combination of hardware and software modules in the decoding processor. The software unit may be located in a mature storage medium in the art, such as a random-access memory, a flash memory, a read-only memory, a programmable read-only memory, or an electrically erasable programmable memory, a register, and the like. The storage medium is located in memory 9. The processor 8 reads information from memory 9 and completes the steps of the foregoing method in combination with the hardware of the processor. The electronic device may also include one entity component or a plurality of entity components according to instructions generated by the processor 8 when executing the method of optically adjusting an image fusion LiDAR system in accordance with some embodiments of the present disclosure. Different entity components may be arranged in the electronic device or outside the electronic device, such as a cloud server. Each entity component cooperates with the processor 8 and the memory 9 to realize the functions of the electronic device in this embodiment.

In addition to the above methods and devices, the embodiments of the present disclosure may also refer to a computer program product, which includes a computer program instruction that, when executed by a processor, causes the processor to execute the method of optically adjusting an image fusion LiDAR system in accordance with some embodiments of the present disclosure.

The program code for performing the operations of the embodiments of the present disclosure may be written in one programming language or any combination of more programming languages, including an object-oriented programming language such as Java, C++, etc., and further including conventional procedural programming language such as "C"-language or a similar programming language. The program code can be executed entirely on a user computing device, partially executed on a user device, as a stand-alone software package, partially executed on the user computing device and partially executed on a remote computing device, or entirely executed on the remote computing device or a server.

In addition, the embodiments of the present disclosure may also refer to a computer readable storage medium storing a computer program instruction which, when executed by a processor, cause the processor to execute the method of optically adjusting an image fusion LiDAR system in accordance with some embodiments of the present disclosure. The computer readable storage medium may employ any combination of one or more readable media. The readable medium may be a readable signal medium or a readable storage medium. The readable storage medium may include, for example, but is not limited to, an electronic, magnetic, optical, electromagnetic, infrared, or semiconductor system, apparatus, or device, or any combination of the above. More specific examples of the readable storage medium (non-exhaustive lists) include: an electrical connection with one or more wires, a portable disk, a hard disk, a random access memory (RAM), a read only memory (ROM), an erasable programmable read only memory (EPROM or flash), an optical fiber, a portable compact disk read only memory (CD-ROM), an optical memory device, a magnetic memory device, or any suitable combination of the above.

The radar calibration method and system for image fusion laser in accordance with some embodiments of the present disclosure are described in detail above. Specific examples are applied to explain the principle and implementation of the present disclosure herein. The above embodiments are only used to help understand the method of the present disclosure and the core idea thereof. Meanwhile, for those of ordinary skills in the art, there will be changes in the specific implementation and application scope according to the idea of the present disclosure. To sum up, the contents of this specification should not be construed as limiting the present disclosure.

It should be noted that relational terms herein such as "first" and "second", etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or device.

The above are only specific embodiments of the present disclosure, so that those skilled in the art can understand or realize the present disclosure. Many modifications to these embodiments will be obvious to those skilled in the art, and the general principles defined herein can be implemented in other embodiments without departing from the spirit or scope of the present disclosure. Therefore, the present disclosure will not to be limited to these embodiments shown herein, but is to be in conformity with the widest scope consistent with the principles and novel features disclosed herein.

INDUSTRIAL APPLICABILITY

The method of optically adjusting an image fusion LiDAR system provided by the present disclosure can ensure that the photoelectric detector and the image detector detect the same object at the same moment in the LiDAR system for image fusion laser, so as to ensure time synchronization precision. The method of optically adjusting an image fusion LiDAR system solves the problem of accumulated errors in the LiDAR system for image fusion laser in the prior art caused by the ensuring assembly and adjustment precision through machining precision in order to ensure that the image detector and the photoelectric detector detect the same object at the same time, and solves the problem of expensive precise machining cost, which is not conducive to mass production. Meanwhile, the method of optically adjusting an image fusion LiDAR system is a novel calibration method that does not depend on the expensive mechanical precision processing method.

What is claimed is:

1. A method of optically adjusting an image fusion LiDAR system, comprising:
   presetting initial positions of a first detector and a second detector;
   acquiring signal strengths of echo signals emitted by diffuse reflection at different positions on a background wall detected by the first detector;
   determining a first mark position on the background wall according to the signal strengths of the echo signals of the echo signals; and
   adjusting at least one of a position or an attitude of the second detector according to an echo signal emitted by diffuse reflection at the first mark position, wherein each of the first detector and the second detector comprises a linear array detector.

2. The method according to claim 1, wherein determining the first mark position on the background wall according to the signal strengths of the echo signals comprises:
   determining a position of the echo signal with the maximum signal strength on the background wall as the first mark position when the signal strength of the echo signal is the maximum.

3. The method according to claim 1, wherein adjusting at least one of the position or the attitude of the second detector according to the echo signal emitted by the diffuse reflection at the first mark position comprises:
   adjusting at least one of the position or the attitude of the second detector until the second detector detects the maximum signal strength of the echo signals emitted by the diffuse reflection at the first mark position.

4. The method according to claim 1, wherein determining the first mark position on the background wall according to the signal strengths of the echo signals comprises:
determining the first mark position in a horizontal direction of the background wall according to the signal strengths of the echo signals;
wherein adjusting at least one of the position or the attitude of the second detector according to the echo signal emitted by diffuse reflection at the first mark position, comprises:
adjusting at least one of the position or the attitude of the second detector in the horizontal direction according to the echo signal emitted by the diffuse reflection at the first mark position.

5. The method according to claim 4, wherein the method further comprises:
after adjusting at least one of the position or the attitude of the second detector in the horizontal direction according to the echo signal emitted by the diffuse reflection at the first mark position, setting a straight line at which the first mark position is located in the vertical direction as a mark line, and presetting an intersection point of the mark line and an echo signal optical axis as a second mark position; and
adjusting at least one of a position or an attitude of the first detector or at least one of the position or the attitude of the second detector in the vertical direction according to an echo signal emitted by diffuse reflection at the second mark position.

6. The method according to claim 1, wherein the first detector is an image detector, and wherein the second detector is a photoelectric detector, and wherein the method further comprises:
after determining the first mark position on the background wall according to the signal strengths of the echo signals,
adjusting at least one of a position or an attitude of a laser emitting module until a laser signal emitted by the laser emitting module is capable of being irradiated to the first mark position.

7. The method according to claim 1, wherein the first detector is a photoelectric detector, wherein the second detector is an image detector, and wherein the method further comprises:
after determining the first mark position on the background wall according to the signal strengths of the echo signals, determining at least one of a position or an attitude when a laser signal emitted by a laser emitting module is irradiated to the first mark position as at least one of an optimal position and an optimal attitude of the laser emitting module.

8. The method according to claim 1, wherein determining the first mark position on the background wall according to the signal strengths of the echo signals comprises:
determining the first mark position in a horizontal direction of the background wall according to the signal strengths of the echo signals;
wherein adjusting at least one of the position or the attitude of the second detector according to the echo signal emitted by diffuse reflection at the first mark position, comprises:
adjusting at least one of a position or an attitude of the second detector in the horizontal direction according to the echo signal emitted by the diffuse reflection at the first mark position.

9. The method according to claim 8, wherein the method further comprises:
after the adjusting at least one of the position or the attitude of the second detector in the horizontal direction according to the echo signal emitted by the diffuse reflection at the first mark position, setting a straight line at which the first mark position is located in the vertical direction as a mark line, and presetting an intersection point of the mark line and an echo signal optical axis as a second mark position; and
adjusting at least one of a position or an attitude of the first detector or at least one of the position or the attitude of the second detector in the vertical direction according to an echo signal emitted by diffuse reflection at the second mark position.

10. A system for optically adjusting an image fusion LiDAR system, comprising: a laser emitting module, a light splitting module, a photoelectric detector, an image detector, a visible light emitter, a background wall, and a controller, wherein:
the photoelectric detector and the image detector are respectively located on two sides of the light splitting module;
the laser emitting module is configured to emit a laser signal to the background wall; and the visible light emitter is configured to emit a visible light signal to the background wall;
the light splitting module is configured to split an echo signal reflected by the background wall into visible light and laser; and the photoelectric detector is configured to receive the laser, and the image detector is configured to receive the visible light; and
the controller is configured to:
preset initial positions of a first detector and a second detector;
acquire signal strengths of echo signals emitted by diffuse reflection at different positions on a background wall detected by the first detector;
determine a first mark position on the background wall according to the signal strengths of the echo signals of the echo signals; and
adjust at least one of a position or an attitude of the second detector according to an echo signal emitted by diffuse reflection at the first mark position, wherein each of the first detector and the second detector comprises a linear array detector.

11. The system according to claim 10, wherein to determine the first mark position on the background wall according to the signal strengths of the echo signals, the controller is further to:
determine a position of the echo signal with the maximum signal strength on the background wall as the first mark position when the signal strength of the echo signal is the maximum.

12. The system according to claim 10, wherein to adjust at least one of the position or the attitude of the second detector according to the echo signal emitted by the diffuse reflection at the first mark position, the controller is further to:
adjust at least one of the position or the attitude of the second detector until the second detector detects the maximum signal strength of the echo signals emitted by the diffuse reflection at the first mark position.

13. The system according to claim 10, wherein to determine the first mark position on the background wall according to the signal strengths of the echo signals, the controller is further to determine the first mark position in a horizontal direction of the background wall according to the signal strengths of the echo signals, and wherein to adjust at least one of the position or the attitude of the second detector according to the echo signal emitted by diffuse reflection at the first mark position, the controller is further to adjust at least one of the position or the attitude of the second detector in the horizontal direction according to the echo signal emitted by the diffuse reflection at the first mark position.

14. The system according to claim 13, wherein the controller is further to:
   after adjusting at least one of the position or the attitude of the second detector in the horizontal direction according to the echo signal emitted by the diffuse reflection at the first mark position, set a straight line at which the first mark position is located in the vertical direction as a mark line, and preset an intersection point of the mark line and an echo signal optical axis as a second mark position; and
   adjust at least one of a position or an attitude of the first detector or at least one of the position or the attitude of the second detector in the vertical direction according to an echo signal emitted by diffuse reflection at the second mark position.

15. The system according to claim 10, wherein the first detector is an image detector, and wherein the second detector is a photoelectric detector, and the controller is further to:
   after determining the first mark position on the background wall according to the signal strengths of the echo signals, adjust at least one of a position or an attitude of a laser emitting module until a laser signal emitted by the laser emitting module is capable of being irradiated to the first mark position.

16. The system according to claim 10, wherein the first detector is a photoelectric detector, wherein the second detector is an image detector, and wherein the controller is further to:
   after determining the first mark position on the background wall according to the signal strengths of the echo signals, determine at least one of a position or an attitude when a laser signal emitted by a laser emitting module is irradiated to the first mark position as at least one of an optimal position and an optimal attitude of the laser emitting module.

17. The system according to claim 10, wherein to determine the first mark position on the background wall according to the signal strengths of the echo signals, the controller is further to determine the first mark position in a horizontal direction of the background wall according to the signal strengths of the echo signals, and wherein to adjust at least one of the position or the attitude of the second detector according to the echo signal emitted by diffuse reflection at the first mark position, the controller is further to adjust at least one of a position or an attitude of the second detector in the horizontal direction according to the echo signal emitted by the diffuse reflection at the first mark position.

18. The system according to claim 17, wherein the controller is further to:
   after the adjusting at least one of the position or the attitude of the second detector in the horizontal direction according to the echo signal emitted by the diffuse reflection at the first mark position, set a straight line at which the first mark position is located in the vertical direction as a mark line, and preset an intersection point of the mark line and an echo signal optical axis as a second mark position; and
   adjust at least one of a position or an attitude of the first detector or at least one of the position or the attitude of the second detector in the vertical direction according to an echo signal emitted by diffuse reflection at the second mark position.

* * * * *